W. T. Bunn,
Plow.
No. 108,444.  Patented Oct. 18, 1870.
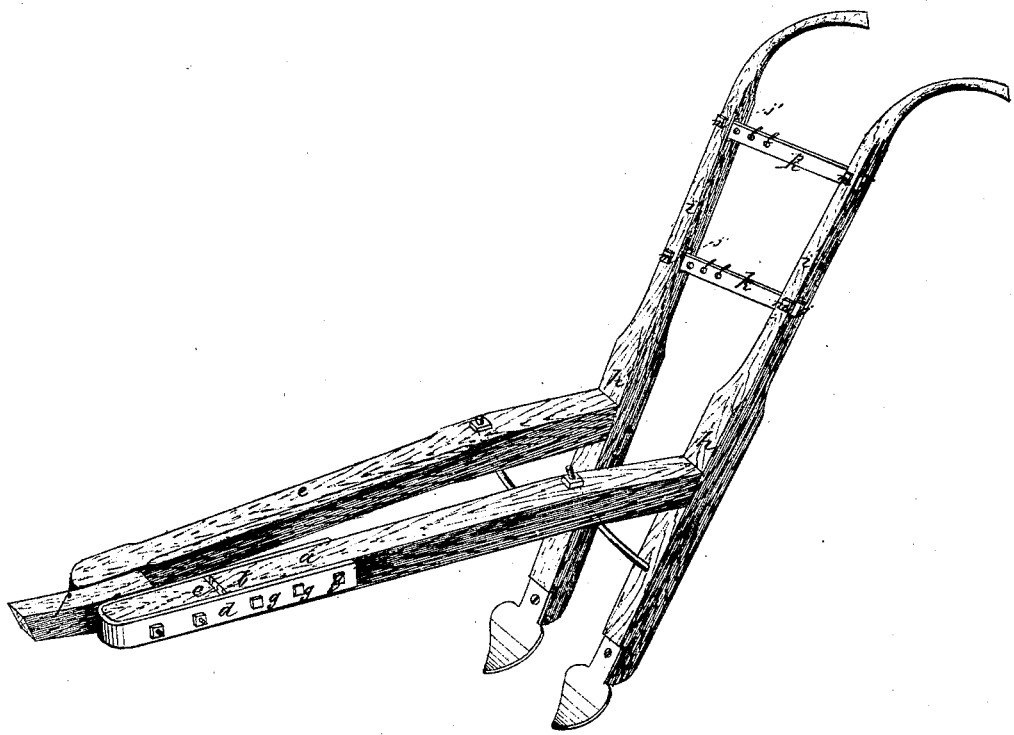
W. T. Bunn, Inventor.
Witnesses.
his Attorneys.

UNITED STATES PATENT OFFICE.

WILLIAM T. BUNN, OF HUMBOLDT, TENNESSEE.

IMPROVEMENT IN PLOWS.

Specification forming part of Letters Patent No. 108,444, dated October 18, 1870.

*To all whom it may concern:*

Be it known that I, WILLIAM T. BUNN, of Humboldt, in the county of Gibson and State of Tennessee, have invented a new and useful Improvement in Plows; and I do hereby declare the following to be a full, clear, and exact description of the same, reference being had to the accompanying drawing, making a part of this specification, in which the figure in the drawing represents a view in perspective.

This invention relates to an improvement in double-shovel plows; and it consists in constructing the stock of the plow of two beams, one of which is provided with a coupling and two shanks provided with handles, the handles being continuations of the shanks, and connecting the beams to a draft-beam and the handles to each other by slats or rods provided with holes for regulating the distance between them, as will hereinafter more fully appear.

In the drawing, $a$ is the left-hand beam, composed of the parts $b$ and $c$, and provided with the coupling $d$; $e$, the right-hand beam, and $f$ the loose draft-beam, to which the beams $a$ and $e$ are fastened by bolts.

$g$ are bolts for lengthening the beam $a$, when desirable.

$h\ h'$ are the shanks, of which the handles $i\ i'$ are continuations. The handles $i\ i'$ are provided with mortises $j\ j'$ for receiving the slats or rods $k$, the latter being provided with holes $l$, into which bolts $m$ are inserted through the handles $i\ i'$ for regulating the distance between the handles, and thereby the shanks of which they are continuations. The bolts $g$ can be withdrawn, the part $b$ of the beam $a$ drawn back, so as to place the left-hand shank $h$ any desired distance in rear of the shank $h'$, and the bolts $g$ replaced to maintain the shanks, &c., in this position.

Any kind of plow-point can be used on the shanks $h\ h'$—viz., common bull-tongue, shovel, half-stove, &c.

The beams $a$ and $e$ and the plow-points are secured to the shanks $h\ h'$ in the usual manner.

Having thus described my invention, what I claim as new, and desire to secure by Letters Patent, is—

The arrangement of the draft-beam $f$ with the plow-beams $e\ a$, the latter being composed of the sections $b$ and $c$, which are connected by the coupling $d$, and so arranged that the length of the beam $a$ may be varied at pleasure for the purpose of placing the shank $h$ either abreast or in rear of the shank $h'$, the shanks $h\ h'$, and the adjustable slats $k$, when all these parts are constructed and arranged to operate as described.

WILLIAM THOMAS BUNN.

Witnesses:
  J. W. PHILP,
  G. E. FISHER.